United States Patent
Greene et al.

(10) Patent No.: US 7,639,994 B2
(45) Date of Patent: Dec. 29, 2009

(54) RF POWER TRANSMISSION NETWORK AND METHOD

(75) Inventors: Charles E. Greene, Cabot, PA (US); Daniel W. Harrist, Carnegie, PA (US); Michael T. McElhinny, Pitcairn, PA (US)

(73) Assignee: Powercast Corporation, Ligonier, PA (US)

(*) Notice: Subject to any disclaimer, the term of this patent is extended or adjusted under 35 U.S.C. 154(b) by 0 days.

(21) Appl. No.: 11/881,203

(22) Filed: Jul. 26, 2007

(65) Prior Publication Data

US 2008/0051043 A1 Feb. 28, 2008

Related U.S. Application Data

(60) Provisional application No. 60/833,864, filed on Jul. 29, 2006.

(51) Int. Cl.
*H04B 1/04* (2006.01)

(52) U.S. Cl. .................. 455/129; 455/127.1; 455/7

(58) Field of Classification Search .............. 455/127.1, 455/343.1, 7, 11.1, 12.1, 14, 15, 16, 19, 20, 455/24, 25; 340/10.1, 10.2, 10.3, 539.1, 340/572.1, 572.3, 572.4, 825.69, 825.72; 333/116

See application file for complete search history.

(56) References Cited

U.S. PATENT DOCUMENTS

| | | | | |
|---|---|---|---|---|
| 4,724,427 A | * | 2/1988 | Carroll | 340/572.1 |
| 5,812,933 A | * | 9/1998 | Niki | 455/16 |
| 6,381,473 B1 | * | 4/2002 | Niki | 455/562.1 |
| 7,327,257 B2 | * | 2/2008 | Posamentier | 340/572.1 |
| 7,400,253 B2 | * | 7/2008 | Cohen | 340/572.1 |
| 2005/0040912 A1 | * | 2/2005 | Pelz | 333/116 |
| 2007/0046434 A1 | * | 3/2007 | Chakraborty | 340/10.1 |
| 2007/0087719 A1 | * | 4/2007 | Mandal et al. | 455/299 |
| 2007/0173214 A1 | * | 7/2007 | Mickle et al. | 455/127.1 |
| 2008/0014897 A1 | * | 1/2008 | Cook et al. | 455/343.1 |
| 2008/0258872 A1 | * | 10/2008 | Scherabon et al. | 340/10.1 |

* cited by examiner

*Primary Examiner*—Blane J Jackson

(57) ABSTRACT

Disclosed is an RF power transmission network. The network includes at least one RF power transmitter, at least one power tapping component, and at least one load. The at least one RF power transmitter, the at least one power tapping component, and the at least one load are connected in series. The RF power transmitter sends power through the network. The power is radiated from the network to be received by a device to be charged, re-charged, or directly powered by the power.

39 Claims, 11 Drawing Sheets

RF POWER TRANSMISSION NETWORK AND METHOD

This application claims the benefit of U.S. Provisional Application No. 60/833,864 filed on Jul. 29, 2006.

BACKGROUND OF THE INVENTION

1. Field of the Invention

The present invention is directed to a series radio frequency (RF) power transmission network.

2. Description of Related Art

As processor capabilities have expanded and power requirements have decreased, there has been an ongoing explosion of devices that operate completely independent of wires or power cords. These "untethered" devices range from cell phones and wireless keyboards to building sensors and active Radio Frequency Identification (RFID) tags.

Engineers and designers of these untethered devices continue to have to deal with the limitations of portable power sources, primarily using batteries as the key design parameter. While the performance of processors and portable devices has been doubling every 18-24 months (driven by Moore's law), battery technology in terms of capacity has only been growing at 6% per year.

Even with power conscious designs and the latest in battery technology, many devices do not meet the lifetime cost and maintenance requirements for applications that require a large number of untethered devices, such as logistics and building automation. Today's devices that need two-way communication require scheduled maintenance every three to 18 months to replace or recharge the device's power source (typically a battery). One-way devices that simply broadcast their status without receiving any signals, such as automated utility meter readers, have a better battery life typically requiring replacement within 10 years. For both device types, scheduled power-source maintenance is costly and can be disruptive to the entire system that a device is intended to monitor and/or control. Unscheduled maintenance trips are even more costly and disruptive. On a macro level, the relatively high cost associated with the internal battery also reduces the practical, or economically viable, number of devices that can be deployed.

The ideal solution to the power problem for untethered devices is a device or system that can collect and harness sufficient energy from the environment. The harnessed energy would then either directly power an untethered device or augment a power supply. However, this ideal solution may not always be practical to implement due to low energy in the environment and site restrictions that limit the ability to use a dedicated energy supply.

A need exists for a system that takes these factors into account and provides a solution for both the ideal situation and also for more restrictive circumstances.

Previous inventions have focused on a parallel network for power distribution, for example, U.S. Provisional Patent Application Nos. 60/683,991 and 60/763,582, both entitled Power Transmission Network and incorporated by reference herein. These inventions did not explore a network in series because, for many applications exploiting this technology, losses from transmission lines, series switches, directional couplers (DC), and connectors are unacceptable. However, in certain applications, these losses are acceptable or may be minimized, for example, a small network with a coaxial cable infrastructure, such as a desk area, or using a new or existing low-loss coaxial cable infrastructure in a building for distributing RF power.

BRIEF SUMMARY OF THE INVENTION

It is an object of this invention to provide an RF power network in series, where the RF power network is suitable to be implemented as a portion of a system that provides RF power to a device in order to charge or re-charge the device or to directly power the device.

A series network has several advantages when compared to a parallel network for certain applications. As an example, the amount of transmission line can be reduced by the use of a series network. In a parallel network, a transmission line is typically connected from the RF power transmitter to each antenna. In a series network, each antenna removes an amount of power from a series connected transmission line. Another advantage of a series RF power transmission network is that the network is easily scalable. As an example, additional antennas may be added to the network by adding additional power tapping components in the series or by adding additional power tapping components to the end of the network, thus increasing the length of the series.

A method and apparatus for high efficiency rectification for various loads, which is suitable for receiving the RF power distributed by the present invention, has been discussed in detail in U.S. Provisional Patent Application No. 60/729,792, which is incorporated herein by reference.

The present invention pertains to an RF power transmission network. The network comprises a first RF power transmitter for generating power. The network comprises at least one power tapping component electrically connected in series to the first RF power transmitter for separating the power received from the first power transmitter into at least a first portion and a second portion. The network comprises at least one antenna electrically connected to the at least one power tapping component for receiving the first portion and transmitting power.

The present invention pertains to a system for power transmission. The system comprises a first RF power transmitter for generating power. The system comprises at least one power tapping component electrically connected in series to the first RF power transmitter for separating the power received from the first RF power transmitter into at least a first portion and a second portion. The system comprises at least one antenna electrically connected to the at least one power tapping component for receiving the first portion and transmitting power. The system comprises a device to be powered. The system comprises a receiving antenna electrically connected to the device and configured to receive the transmitted power.

The present invention pertains to a method for RF power transmission. The method comprises the steps of generating power with a first RF power transmitter. There is the step of separating the power received from the first power transmitter into at least a first portion and a second portion with at least one power tapping component electrically connected in series to the first RF power transmitter. There is the step of receiving the first portion by at least one antenna electrically connected to the at least one power tapping component. There is the step of transmitting power with the at least one antenna.

The present invention pertains to an apparatus for wireless power transmission to a receiver having a wireless power harvester which produces direct current. The apparatus comprises a combiner having a first input having a first power. The apparatus comprises a second input having a second power. The apparatus comprises an output having an output power that is a combination of the first power and the second power and greater than the first power and the second power individually. The apparatus comprises an antenna electrically connected to the output through which the output power is transmitted to the receiver.

The present invention pertains to an apparatus for wireless power transmission to a receiver having a wireless power harvester which produces direct current. The apparatus comprises a field adjustable coupler to increase or decrease power to a desired level having a mainline and a secondary line a distance d from the mainline. The apparatus comprises an adjustable mechanism that varies the distance d. The apparatus comprises an antenna through which the power is transmitted to the receiver.

DETAILED DESCRIPTION OF THE INVENTION

Figure 1:
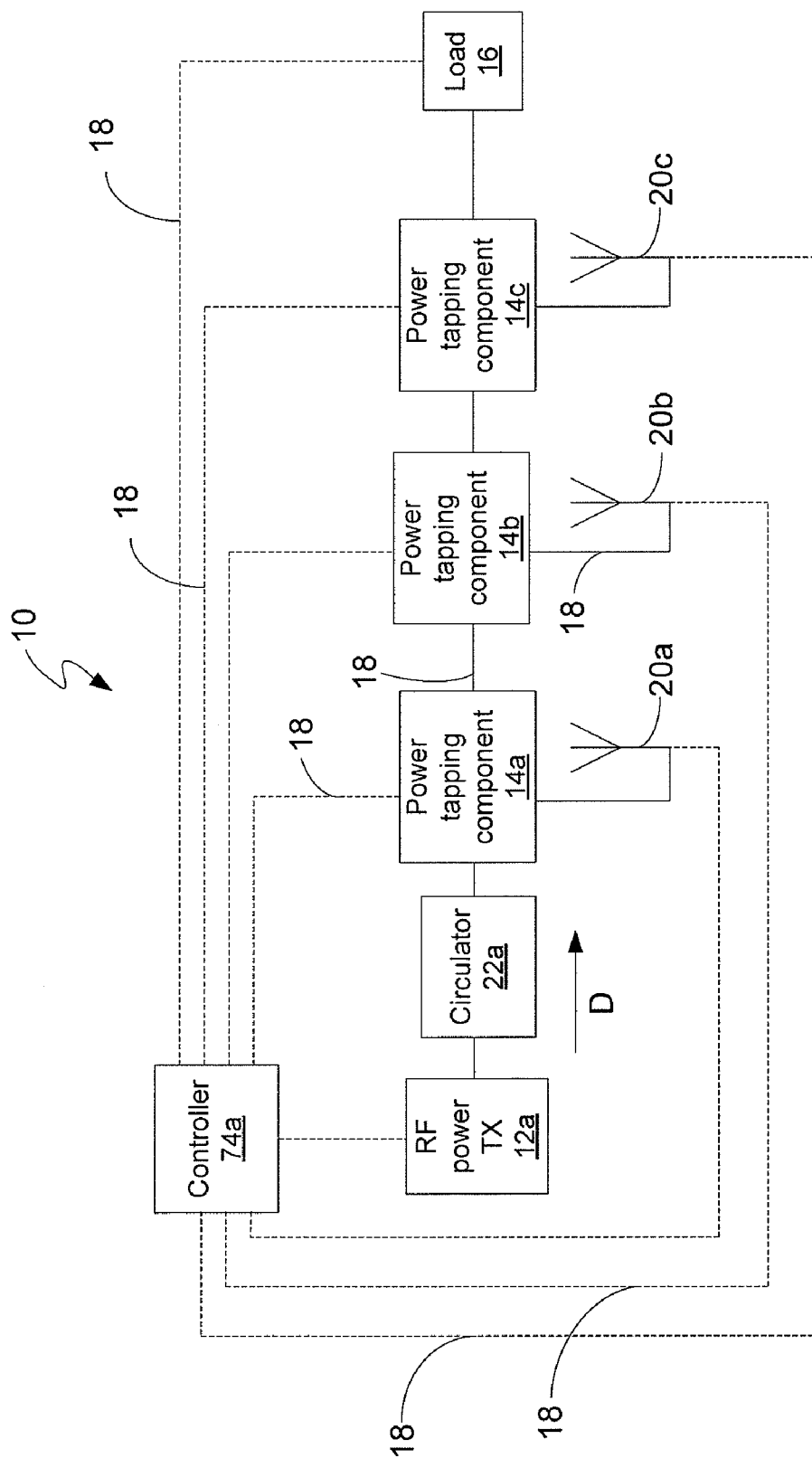
FIG. 1 is an illustration of a simple series network according to the present invention.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention pertains to an RF power transmission network 10, as shown in FIG. 1. The network 10 comprises a first RF power transmitter 12a for generating power. The network 10 comprises at least one power tapping component 14a electrically connected in series to the first RF power transmitter 12a for separating the power received from the first power transmitter 12a into at least a first portion and a second portion. The network comprises at least one antenna 20a electrically connected to the at least one power tapping component 14a for receiving the first portion and transmitting power.

Figure 2:
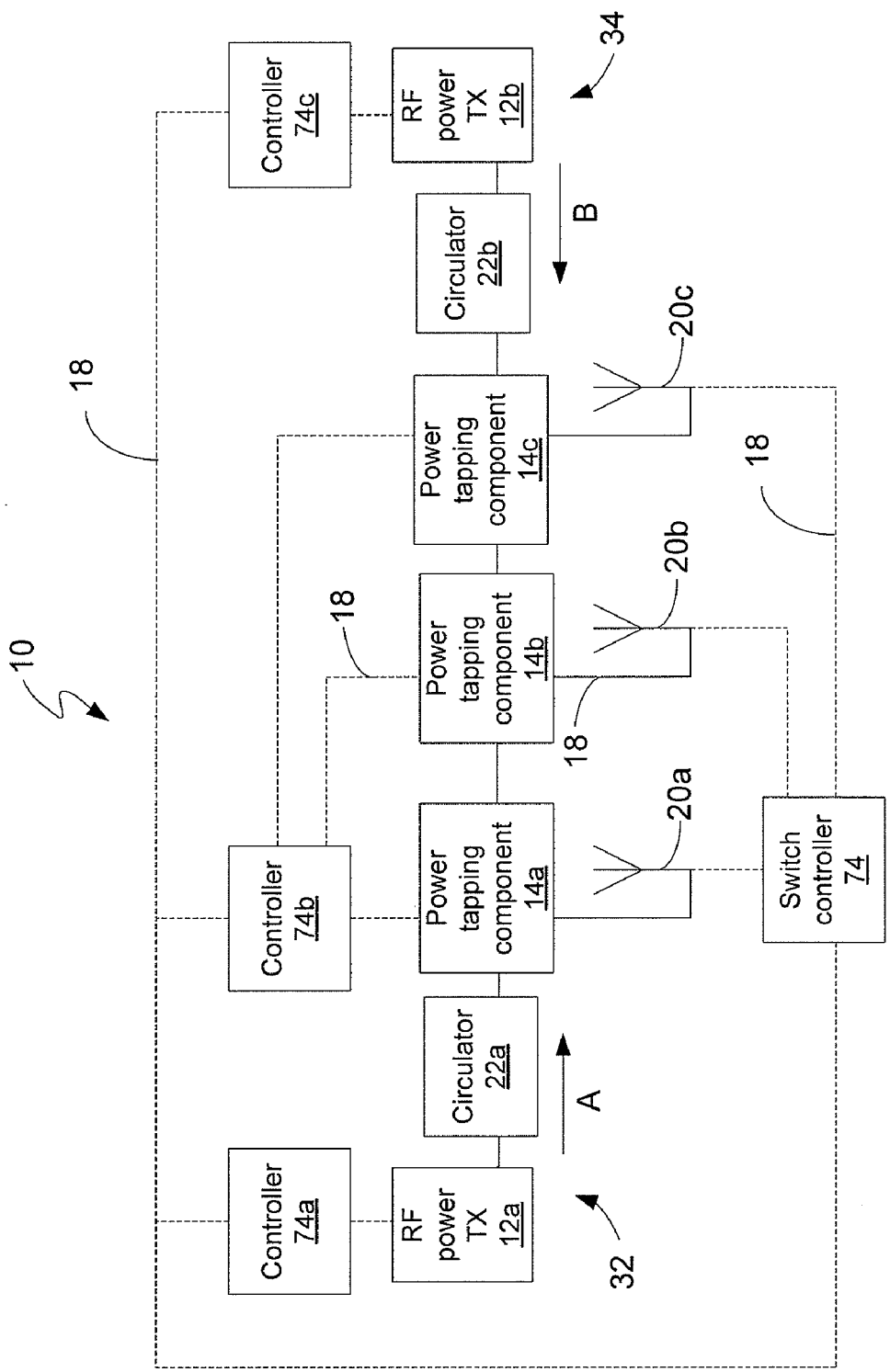
FIG. 2 is an illustration of a multiple input series network according to the present invention.
Figure 3:
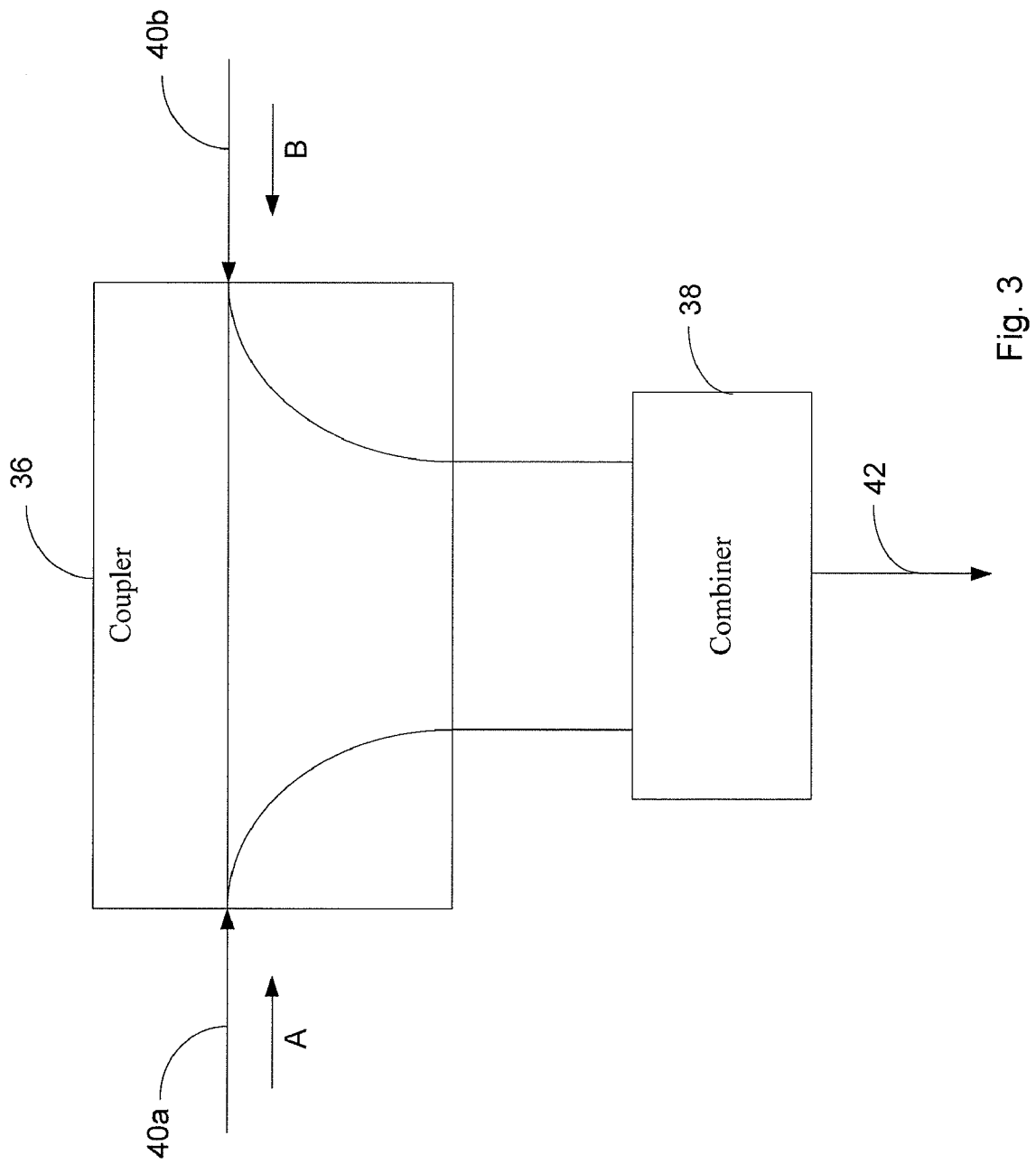
FIG. 3 is an illustration of a coupler that may be used with the present invention.
Figure 4:
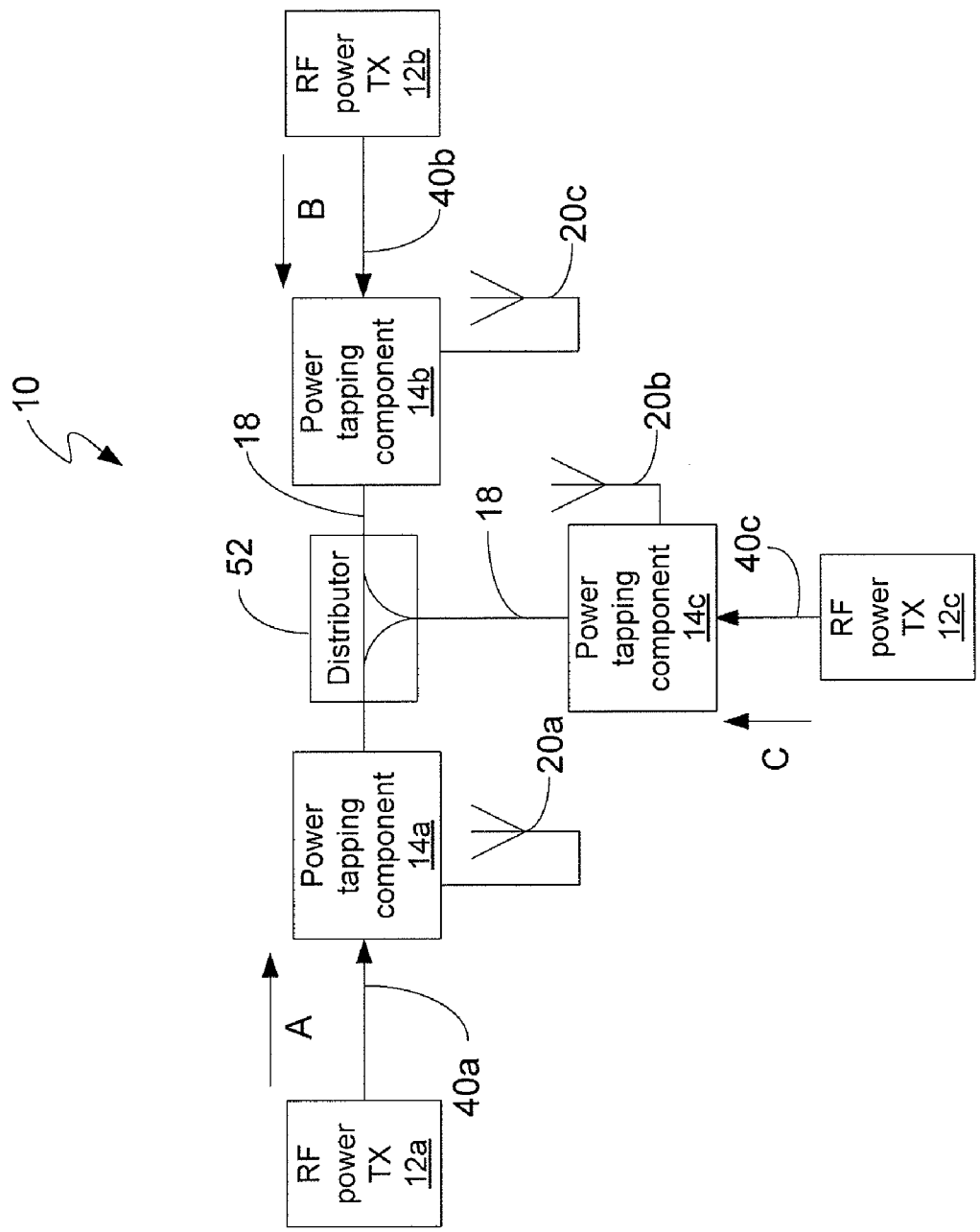
FIG. 4 is an illustration of a three transmitter network according to the present invention.

The at least one power tapping component 14a can be a directional coupler 36, as shown in FIG. 3. The network 10 can include a second RF power transmitter 12b electrically connected in series to the at least one power tapping component 14a, as shown in FIG. 2. The network 10 can include at least one controller 74a electrically connected to one or more of the first RF power transmitter 12a, the at least one power tapping component 14a, the at least one antenna 20a, and the second RF power transmitter 12b. The at least one power tapping component 14a can be a bi-directional coupler 36. Alternatively, the at least one power tapping component can be a power distributor 52, as shown in FIG. 4.

The network 10 can include at least one additional RF power transmitter 12b electrically connected in series to the at least one power tapping component 14a, as shown in FIG. 2. The network 10 can include at least one controller 74a electrically connected to one or more of the first RF power transmitter 12a, the at least one power tapping component 14a, the at least one antenna 20a, and the at least one additional RF power transmitter 12b. The network 10 can include a terminating load 16. The network 10 can include at least one transmission line 18. In one embodiment, the power transmitted from the first RF power transmitter 12a does not include data.

The network 10 can include at least one controller 74a electrically connected to one or more of the first RF power transmitter 12a, the at least one power tapping component 14a, and the at least one antenna 20a. At least one controller 74a of the at least one controllers can be electrically connected to at least one other controller 74b of the at least one controllers. The network 10 can be configured to transmit the power via the at least one antenna 20a in pulses.

Figure 9:
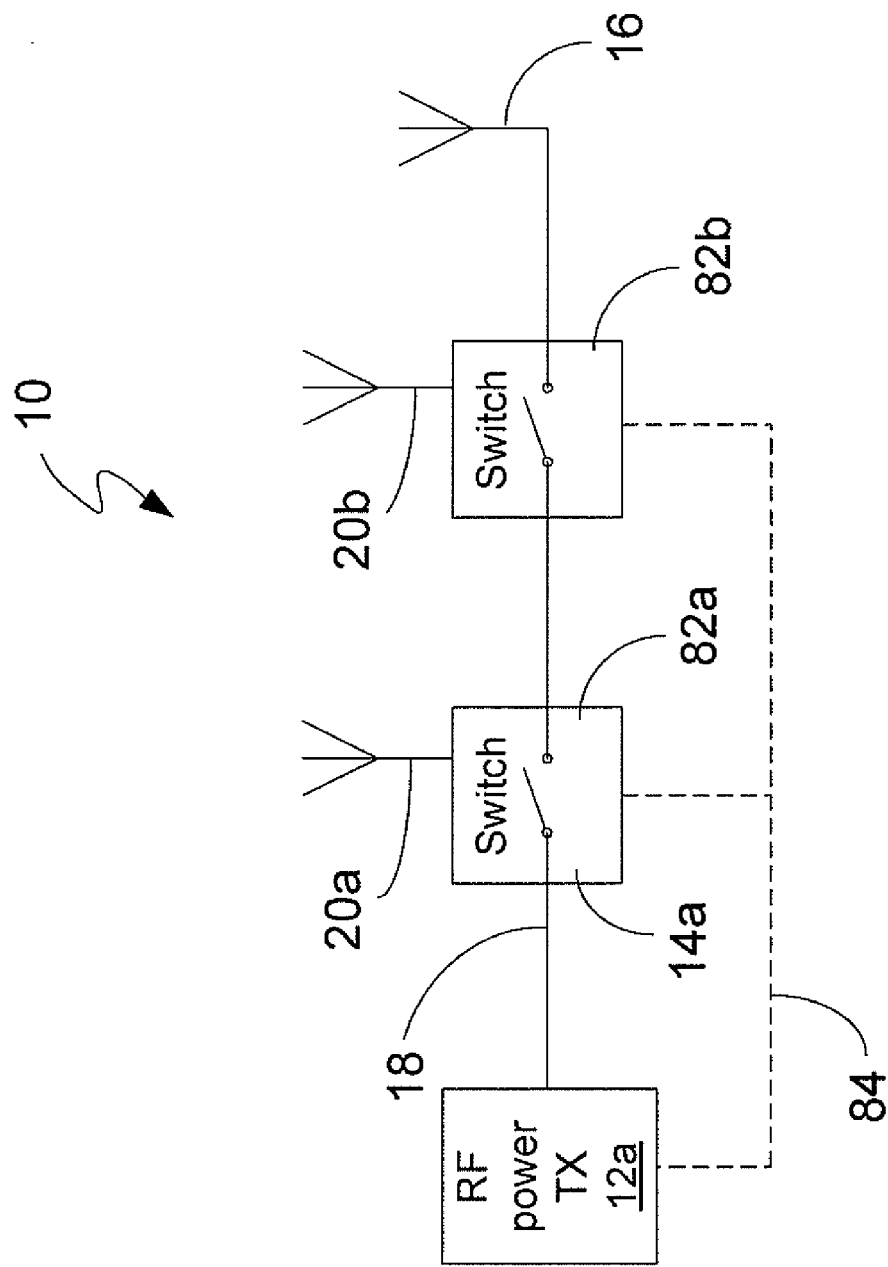
FIG. 9 is an illustration of a switching network according to the present invention.

At least one of the at least one power tapping component 14 can be a switch 82a, as shown in FIG. 9. The switch 82a can be controlled via a control line. The switch 82a can be controlled by sensing power. The sensed power can be pulses of power. The pulses of power can vary in duration. The pulses of power can vary in timing. The switch 82a can be controlled via a communications signal. The communications signal can be sent via coaxial cable.

The antenna 20a can be a transmission line 18, as shown in FIG. 1. At least a portion of the power received from the first RF power transmitter 12a can be used by the at least one power tapping component 14a as operational power. The network 10 can include a second power tapping component 14b electrically connected in series to the at least one power tapping component 14a, with the at least one power tapping component 14a disposed between the first RF power transmitter 12a and the second power tapping component 14b. The second power tapping component 14b receives the second portion from the at least one power tapping component 14a and separates it into at least a third portion and a fourth portion.

The first RF transmitter 12a may only include a first connector which electrically connects the first RF power transmitter 12a to the at least one power tapping component 14a; and the at least one power tapping component 14a includes a second connector which electrically connects the at least one power tapping component to the second power tapping component 14b.

Figure 11:
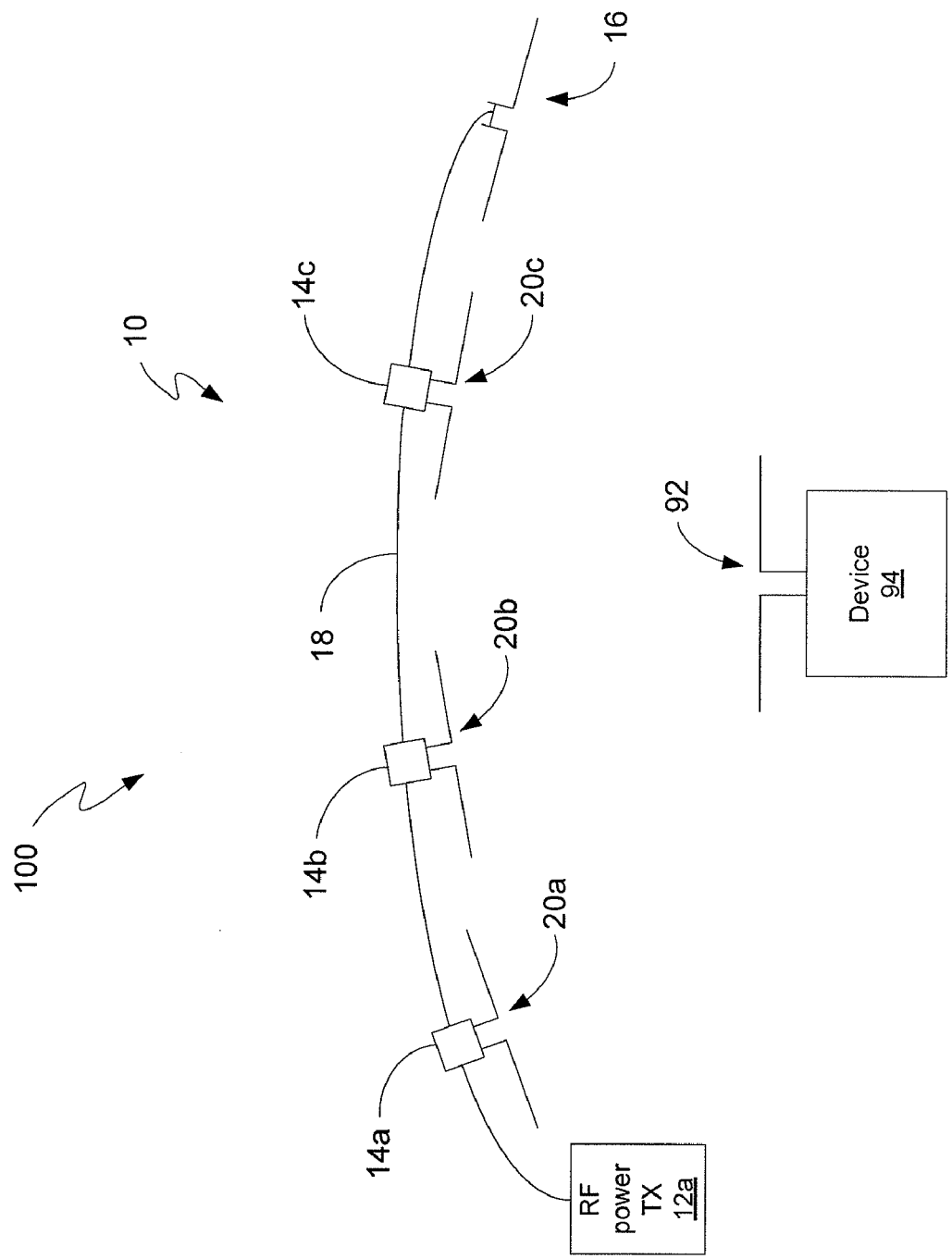
FIG. 11 is an illustration of a desk top installation of the present invention.

The present invention pertains to a system 100 for power transmission, as shown in FIG. 11. The system comprises a first RF power transmitter 12a for generating power. The system comprises at least one power tapping component 14a electrically connected in series to the first RF power transmitter 12a for separating the power received from the first RF power transmitter 12a into at least a first portion and a second portion. The system comprises at least one antenna 20a electrically connected to the at least one power tapping component 14a for receiving the first portion and transmitting power. The system comprises a device 94 to be powered. The system comprises a receiving antenna 92 electrically connected to the device 94 and configured to receive the transmitted power.

The network 10 can include at least one controller 74a electrically connected to one or more of the RF power transmitter, the at least one power tapping component 14a, and the at least one antenna 20a, as shown in FIG. 1. At least one of the at least one power tapping components can be a switch 82a, as shown in FIG. 9. The system 100 can be configured to transmit the power via the at least one antenna 20a in pulses. At least a portion of the power received from the first RF power transmitter 12a can be used by the at least one power tapping component 14a as operational power. In one embodiment, power transmitted from the first RF power transmitter 12a does not include data.

The network 10 can include a second power tapping component 14b electrically connected in series to the at least one power tapping component 14a, with the at least one power tapping component 14a disposed between the first RF power transmitter 12a and the second power tapping component 14b, as shown in FIG. 11. The second power tapping component 14b receives the second portion from the at least one power tapping component 14a and separates it into at least a third portion and a fourth portion; and a second antenna 20b electrically connected to the second power tapping component 14b for receiving the third portion and transmitting power.

As shown in FIG. 3, there is an apparatus for wireless power transmission to a receiver having a wireless power harvester which produces direct current. The apparatus comprises a combiner 38 having a first input 40a having a first power. The apparatus comprises a second input 40b having a second power. The apparatus comprises an output having an output power that is a combination of the first power and the second power and greater than the first power and the second power individually. The apparatus comprises an antenna 20a electrically connected to the output through which the output power is transmitted to the receiver.

Figure 6:
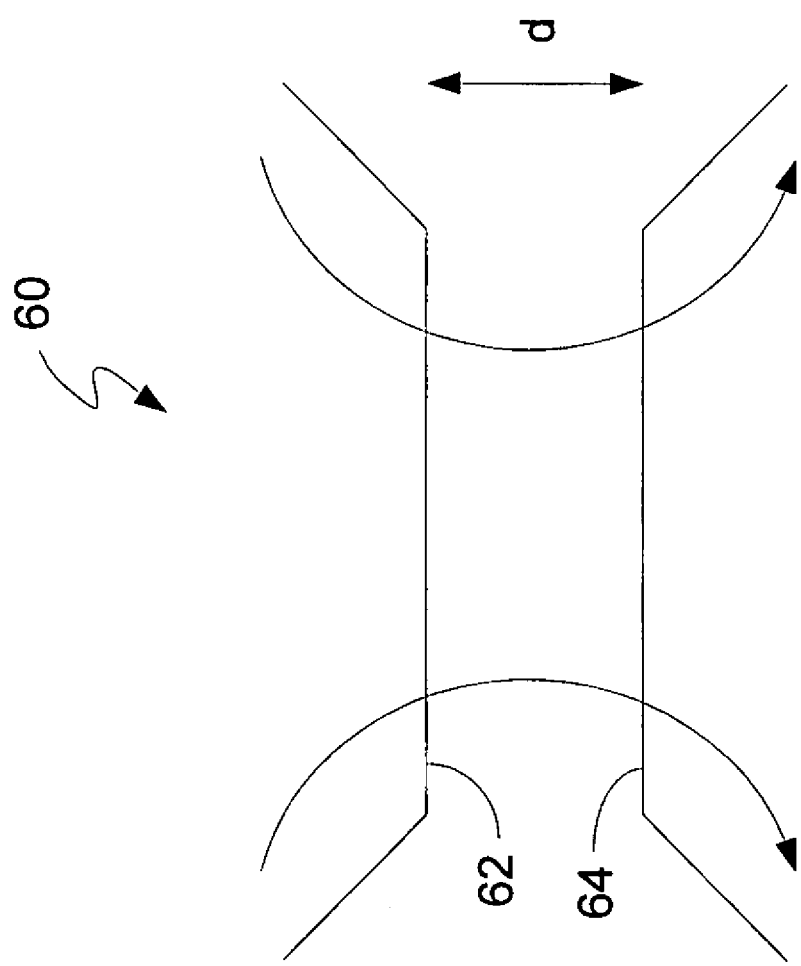
FIG. 6 is an illustration of an adjustable directional coupler that may be used with the present invention.

As shown in FIG. 6, there is an apparatus for wireless power transmission to a receiver having a wireless power harvester which produces direct current. The apparatus comprises a field adjustable coupler 60 to increase or decrease power to a desired level having a mainline 62 and a secondary line 64 a distance d from the mainline 62. The apparatus comprises an adjustable mechanism that varies the distance d. The apparatus comprises an antenna 20a through which the power is transmitted to the receiver.

The present invention pertains to a method for RF power transmission. The method comprises the steps of generating power with a first RF power transmitter 12a, as shown in FIG. 11. There is the step of separating the power received from the first power transmitter 12a into at least a first portion and a second portion with at least one power tapping component electrically 14a connected in series to the first RF power transmitter 12a. There is the step of receiving the first portion by at least one antenna 20a electrically connected to the at least one power tapping component 14a. There is the step of transmitting power with the at least one antenna 20a.

The method can include the steps of receiving the power transmitted wirelessly from the at least one antenna 20a at a receiving antenna 92 electrically connected to a device 94 and configured to receive the transmitted power; and converting the power received by the receiving antenna 92 with a power harvester disposed in the device 94 electrically connected to the device 94. The method can include the steps of adding a second power tapping component 14b electrically connected in series to the at least one power tapping component, with the at least one power tapping component 14a disposed between the first RF power transmitter 12a and the second power tapping component 14b. The second power tapping component 14b receives the second portion from the at least one power tapping component 14a and separates it into at least a third portion and a fourth portion. There can be the step of receiving the third portion at a second antenna 20b electrically connected to the second power tapping component 14b. There can be the step of transmitting power from the second antenna 20b.

Single Input Series Network

Referring generally to FIG. 1, a single input ("simple") series power distribution/transmission network 10, according to the present invention, includes a single RF power transmitter 12a and at least one power tapping component (PTC) 14a. The single input series network 10 terminates with a load 16. The PTCs 14a-c are connected in series.

Power travels in a direction D from the RF power transmitter 12a. Thus, in the single input series network 10, there is a single power direction. As illustrated in FIG. 1, power travels from left to right.

Connections 18 (generally referred to as transmission line herein) in the network 10 are made via a coaxial cable, transmission line, waveguide, or other suitable means. A load 16 may include, but is not limited to, an antenna, terminator, coupler, directional coupler, bi-directional coupler, splitter, combiner, power distributor, circulator, attenuator, or any other component that acts as a load. The transmission line 18 or the last PTC 14c should be terminated to eliminate reflections using a load 16. It should be noted that the circulator, as well as the splitter and the combiner could also feed the reflected power back into a series connection.

A PTC 14a removes power from a transmission line 18 (or other connection) and supplies the removed power to another component, such as a load 16, an antenna 20a, or other transmission line 18. Preferably, a PTC 14a passes any remaining power to the next component in the series, such as a load 16, an antenna 20a, another PTC 14b, or other transmission line 18.

Preferably, a PTC 14a has three or more input/outputs (connectors) in which power is input, output (accepted), and/or output (passed). For example, a PTC 14a has an input, a first output for accepted power, and a second output for passed power. The PTC 14a receives power at the input. The PTC 14a separates the power into a first portion and a second portion. The first portion is "accepted" and sent to the first output, for example, to an antenna 20a (discussed below). The second portion is "passed" and sent to the next component in the series, for example, another PTC 14b.

A PTC 14a may be a directional coupler, as illustrated in FIG. 1. A directional coupler may be implemented with a splitter or a combiner.

One output of each PTC 14ac is preferably connected to an antenna 20ac, respectively. Each antenna 20ac radiates power into a coverage area (or volume). A coverage area is defined by a minimum electric and/or magnetic field strength. As an example, a coverage area may be defined as an area (or space) in which the electric field strength radiated is greater than two volts per meter (2 V/m). The coverage area from a given antenna 20a may or may not overlap other coverage areas from other antennas 20b, 20c. Other outputs of each PTC 14ac may be connected to a load 16 and other transmission lines 18.

When the PTCs 14ac are implemented as directional couplers, the directional couplers may be designed to tap (or remove) a certain percentage (dB) from the transmission line 18. For example, a −20 dB coupler and a 1000 Watt(W) input result with a 10 W output to the terminating load 16. The directional couplers in the network 10 may all have the same coupling (e.g., −20 dB) or may be designed on a case-to-case basis to use standard coupling (e.g., −3, −6, −10 dB) or non-standard coupling (e.g., −3.4, −8, −9.8 dB).

A circulator 22a or isolator may be connected between the RF power transmitter 12 and the first PTC 14a in the series in order to protect against reflected power that would cause damage to the RF power transmitter 12a.

FIG. 1 illustrates the single input series network 10 with an RF power transmitter 12a, a circulator 22a, three PTCs 14ac (implemented as directional couplers) each connected to an antenna 20ac, respectively, and a terminating load 16.

In use, the RF power transmitter 12a supplies power along a transmission line(s) 18 to each PTC 14ac in the network 10. Each PTC 14ac taps power from the line and sends the power to the respective connected antennas 20ac, load 16. The antennas 20ac, load 16 radiate the power to coverage areas corresponding to each antenna 20ac, load 16. When in a coverage area, a device to be powered receives the radiated power. The received power is used to charge or re-charge the device or to directly power the device.

Dual Input Series Network

Referring generally to FIG. 2, a dual input series power distribution/transmission network 10, according to the present invention, includes a first RF power transmitter 12a at a first end 32 of the network 30 and a second RF power transmitter 12b at a second end 34 of the network 10. One or more PTCs 14 are located in series between the first RF power transmitter 12a and the second RF power transmitter 12b.

Preferably, each PTC 14 is also connected to a respective antenna 20ac. Each antenna 20ac radiates power into a coverage area. The coverage area from a given antenna 20a may or may not overlap other coverage areas from other antennas 20b, 20c.

The PTCs 14ac may be bi-directional couplers that couple waves in both directions. This allows for dual power directions—a first power direction A stemming from the first RF power transmitter 12a and a second power direction B stemming from the second RF power transmitter 12b.

A first circulator 22a may be connected next to the first RF power transmitter 12a to be between the first RF power transmitter 12a and the PTC 14a next in line in the series in order to protect against reflected power that would cause damage to the first RF power transmitter 12a. Likewise, a second circulator 22b may be located between the second RF power transmitter 12b and the corresponding PTC 14b next in line in the series.

The first RF power transmitter 12a and the second RF power transmitter 12b may be on the same frequency. Due to component tolerances, however, they will actually be on slightly different frequencies and will drift in and out of phase, averaging to a finite value. This issue is discussed in detail in U.S. patent application Ser. No. 11/699,148 and U.S. Provisional Patent Application No. 60/763,582, both entitled Power Transmission Network, which are incorporated herein by reference. The first RF power transmitter 12a and the second RF power transmitter 12b may also be designed to be on different frequencies or on separate channels.

An advantage of a network 10 with dual (or multiple, discussed below) RF power transmitters 12a, 12b is that the network 10 distributes loss along the transmission line 18 rather than concentrating the loss at one end (as with a single input series network 10). Another advantage is that less power is needed for each RF power transmitter 12a, 12b. For example, a single transmitter 12a could input 1000 W, or two transmitters 12a, 12b could input 500 W each. The two inputs of 500 W would be the cheaper network 10, in terms of power and component costs, etc. The RF power transmitters 12a, 12b may have different power levels if found to be advantageous.

FIG. 2 illustrates a dual input series network 10 having a first RF power transmitter 12a, a first circulator 22a, three PTCs 14ac (implemented as bi-directional couplers) each connected to an antenna 20a, a second circulator 22b, and a second RF power transmitter 12b.

In use, the RF power transmitters 12a and 12b supply power along a transmission line(s) 18 to each PTC 14ac in the network 10. Each PTC 14ac taps power from the line and sends the power to the connected antenna 20ac, respectively. The antennas 20ac radiate the power to coverage areas corresponding to each antenna 20ac. When in a coverage area, a device to be powered receives the radiated power. The received power is used to charge or re-charge the device or to directly power the device.

Referring to FIG. 3, a given bi-directional coupler 36 may need a combiner 38 to combine the power from each power direction A, B. A first input 40a having a first initial power enters the bi-directional coupler 36 from the first power direction A. A second input 40b having a second initial power enters the bi-directional coupler 36 from the second power direction B. A tap of the first input (for example, −20 dB) and a tap of the second input (for example, −20 dB) are combined in the combiner 38 to output a combined power 42 to the antenna 22a or another transmission line 18 (or a combination of the two).

The first input leaving the bi-directional coupler 36, which may be an input to another bi-directional coupler 36, has been decreased by the amount of power tapped and by an amount of loss from the coupler 36 itself (insertion loss). The same holds for the second input leaving the bi-directional coupler 36. In other words, when the first input 40a exits the bi-directional coupler 36, the amount of power now present equals the initial power minus the amount tapped minus power lost within the coupler 36 (insertion loss).

Alternatively, the bi-directional coupler 36 may be designed to not sense direction of the power, therefore not requiring a combiner 38. Therefore, the PTC 14a (bi-directional coupler in this case) may be termed simply a coupler.

Multiple Input Series Network

Referring generally to FIG. 4, a multiple input series power distribution/transmission network 10, according to the present invention, includes a first RF power transmitter 12a, a second RF power transmitter 12b, and at least a third RF power transmitter 12c connected via a power distributor 52, for example, in a star or cluster pattern. One or more PTCs 14ac may be located in series between the first, second, and/or third RF power transmitter 12a-c and the power distributor 52.

Preferably, each PTC 14ac is also connected to an antenna 20ac, respectively. Each antenna 20ac radiates power into a coverage area. The coverage area from a given antenna 20a may or may not overlap other coverage areas from other antennas 20b, 20c.

The PTCs 14ac may be bi-directional couplers that couple waves in two directions. The power distributor 52 couples waves (or routes power) in multiple directions. This allows for multiple power directions—a first power direction A stemming from the first RF power transmitter 12a, a second power direction B stemming from the second RF power transmitter 12b, and a third power direction C stemming from the third RF power transmitter 12c. The power distributor 52 may be a combiner or a splitter. Compared to the dual input series network 10 (illustrated in FIG. 2), in the multiple input series network 10, the network 10 not only includes a first input 40a from the first RF power transmitter 12a and a second input 40b from the second RF power transmitter 12b, but also includes at least a third input 40c from the third RF power transmitter 12c.

Figure 5:
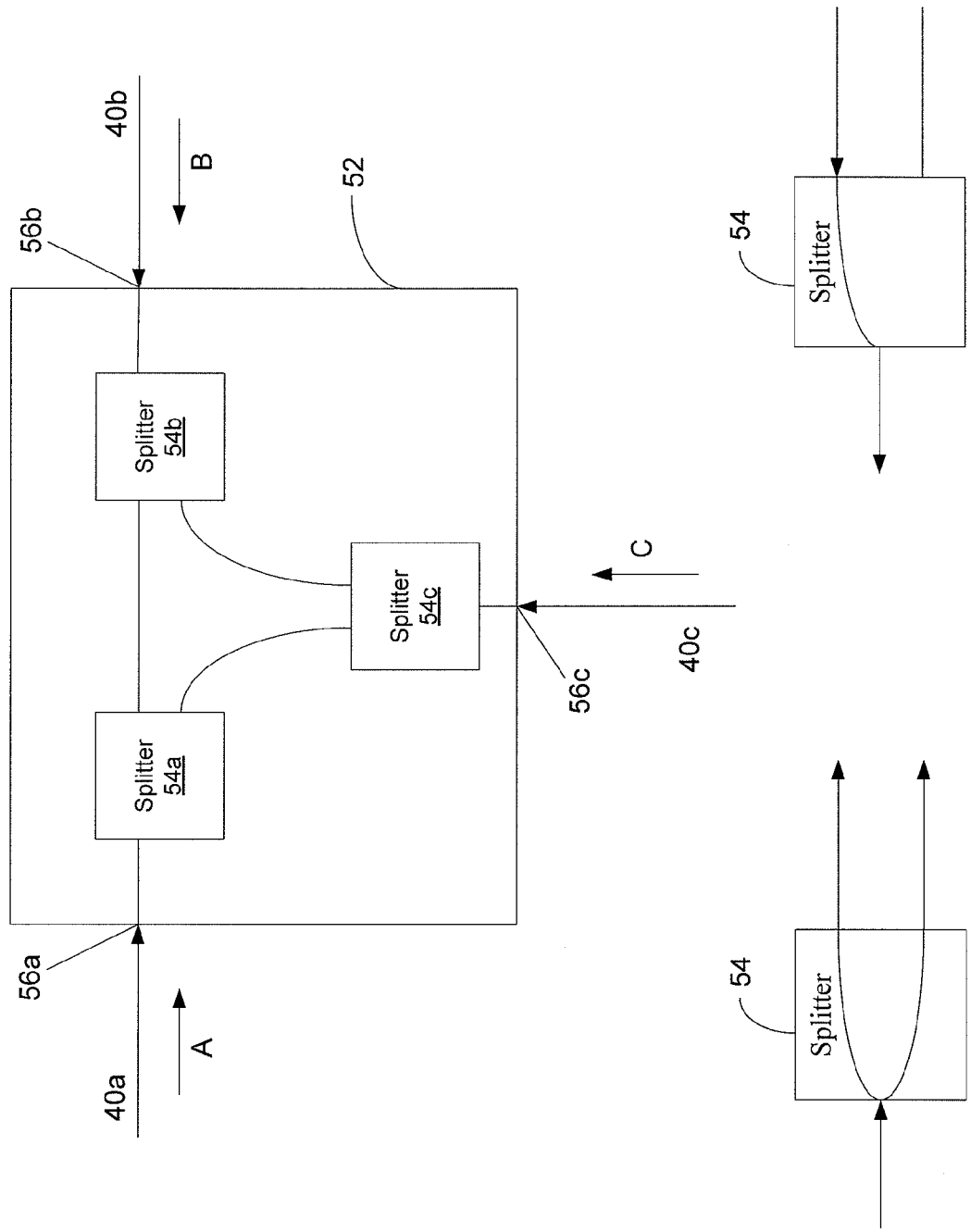
FIG. 5 is an illustration of a power distributor for use with the present invention.

Referring to FIG. 5, the number of ports on the power distributor 52 may be increased by using 1 to N splitters, giving N+1 ports on the power distributor 52. Each of the outputs on one splitter 54a is connected to one of the outputs of another splitter 54b. For example, as illustrated in FIG. 5, a three port power distributor 52 includes three 1 to 2 splitters 54a-c. Power from direction A enters a first port 56a, is split by splitter 54a, and is directed to splitters 54b and 54c. Power from direction B enters a second port 56b, is split by splitter 54b, and is directed to splitters 54a and 54c. Power from direction C enters a third port 56c, is split by splitter 54c, and is directed to splitters 54a and 54b.

The multiple input series network 10, shown in FIG. 4, may include additional RF power transmitters and/or additional power distributors connected in various configurations. In other words, the network 10 may be expanded such that more than one power distributor 52 connects multiple RF power transmitters 12ac. Thus, the network 10 may include multiple star patterns or clusters.

FIG. 4 illustrates a multiple input series network 10 having a first RF power transmitter 12a, a second RF power transmitter 12b, a third RF power transmitter 12c, and a power distributor 52. A first PTC 14a (implemented as a bi-directional coupler) is connected between the first RF power transmitter 12a and the power distributor 52. A second PTC 14b is connected between the second RF power transmitter 12b and the power distributor 52. A third PTC 14c is connected between the third RF power transmitter 12c and the power distributor 52. Each PTC 14ac is also connected to an antenna 20a.

In use, the RF power transmitters 12a-c supply power along a transmission line 18 to each PTC 14 in the network 10. Each PTC 14ac taps power from the line and sends the power to the connected antenna 20ac, respectively. The antennas 20ac radiate the power to coverage areas corresponding to each antenna 20ac. When in a coverage area, a device to be powered receives the radiated power. The received power is used to charge or re-charge the device or to directly power the device.

Adjustable PTC

In general, the amount of power exiting a PTC 14a is equal to the amount of power which entered the PTC 14a reduced by the amount of power which was tapped by the PTC 14a. Thus, the initial amount of power from an RF power transmitter 12a is reduced each time it passes through a PTC 14ac.

For example, a network includes two PTCs implemented as −20 dB couplers. If the input to the first coupler is 100 W, the amount tapped would be 1 W (i.e., 100 W/100=1 W) and the amount of power exiting would be 99 W (i.e., 100 W−1 W=99 W). When the 99 W reaches the second −20 dB coupler, the amount tapped would be 0.99 W (99 W/100=0.99 W) and the amount exiting the second coupler would be 98.01 W.

Referring generally to FIG. 6, in order to make all outputs equal or at a desired level, a field adjustable PTC 60 may be utilized with the present invention. The field adjustable PTC 60 allows the power to be increased or decreased to a desired level by changing a coupling factor.

For example, the PTC 60 is a bi-directional coupler. In order to make the bi-directional coupler adjustable an adjustment mechanism, such as but not limited to, a screw or electrical controller is introduced to vary the distance or electrical properties. The coupling factor is dependent on a distance d between a mainline 62 and a secondary line 64 of the bi-directional coupler or the electrical properties of the coupler. It should be noted that changing a length of the coupler would also vary the properties.

By including a field adjustable PTC 60 in the network 10, the power coupled to each antenna throughout the network 10 may be maintained at an approximately constant level.

Figure 7:
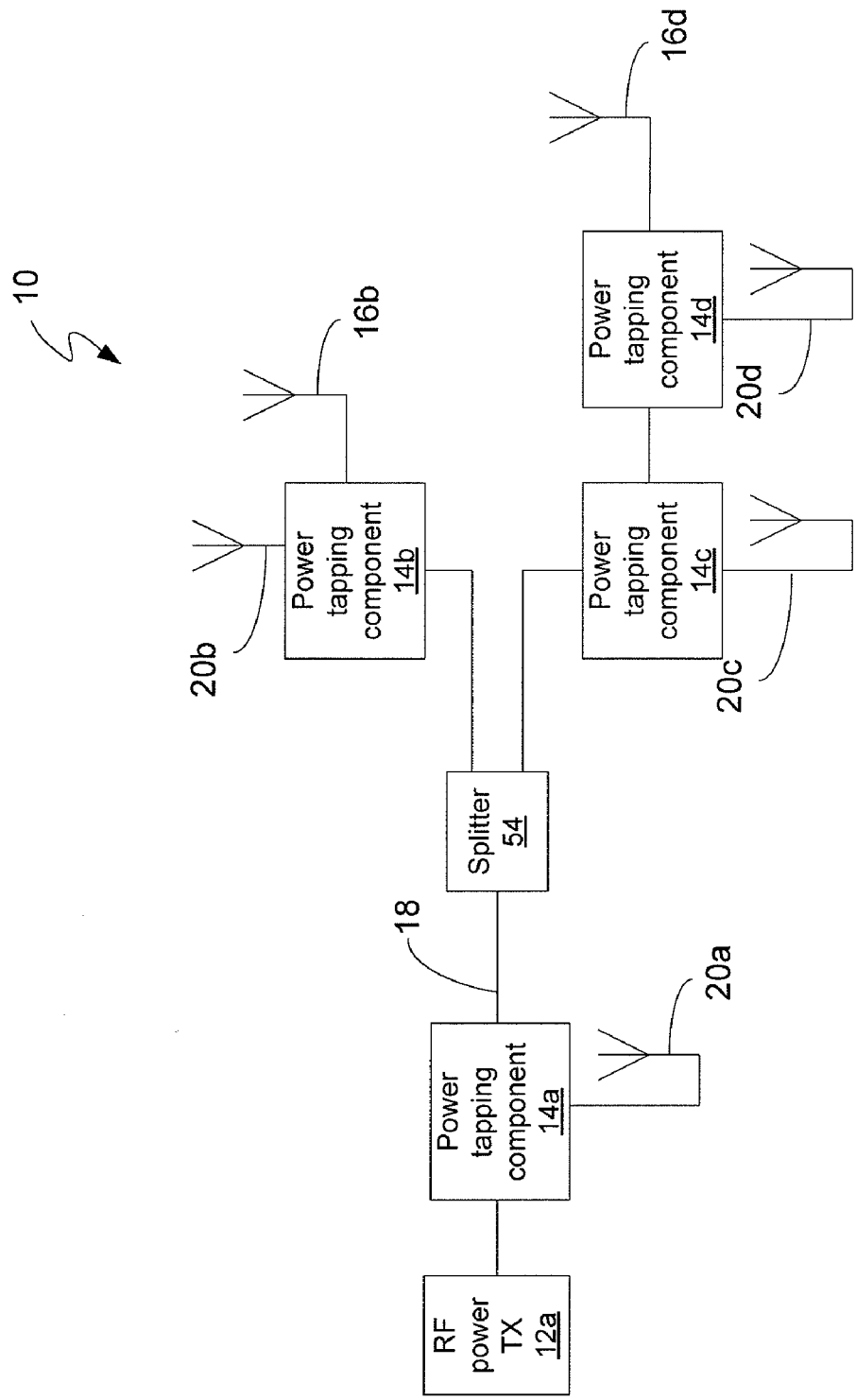
FIGS. 7 and 8 are illustrations of a multiple path networks according to the present invention.
Figure 8:
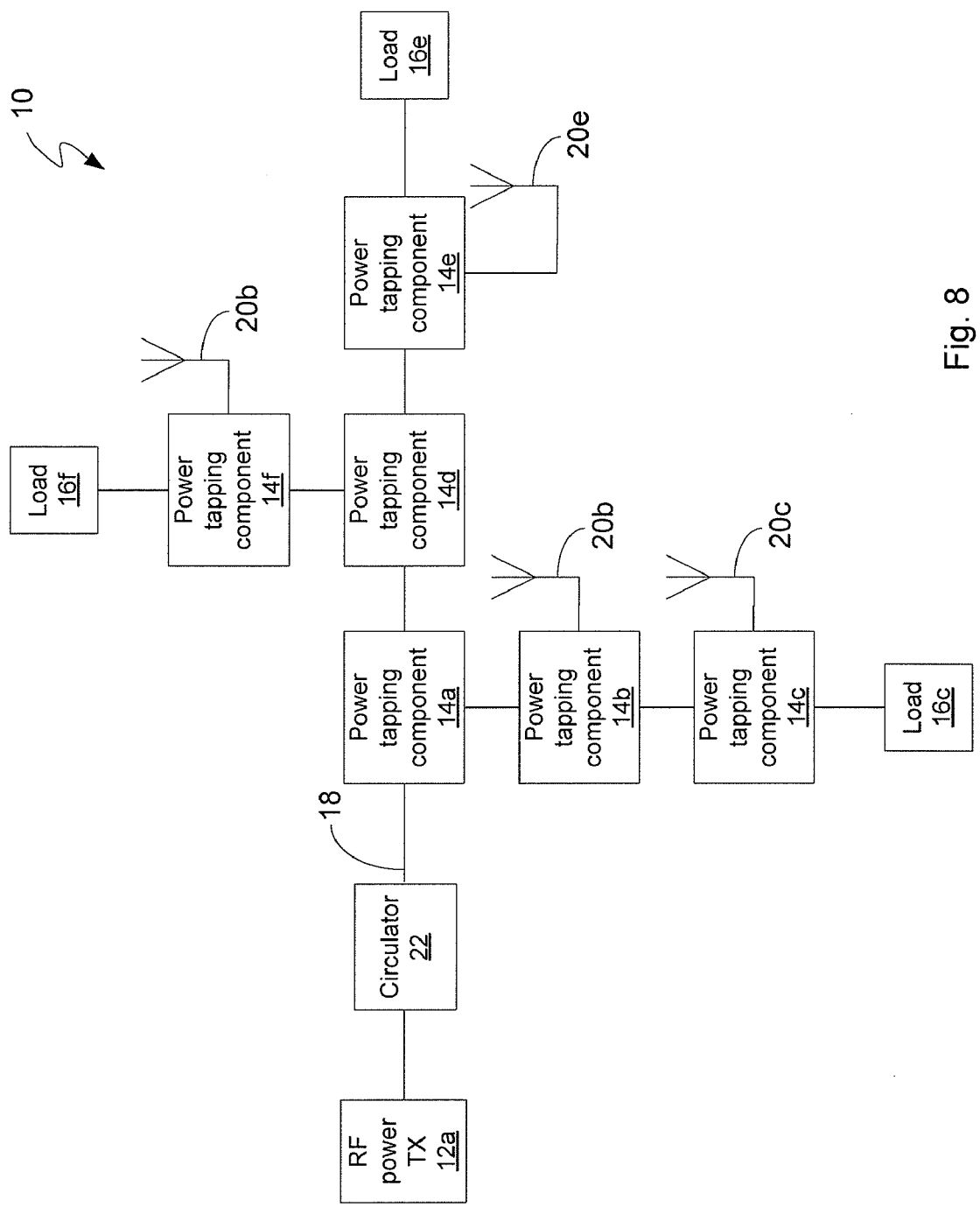

Referring to FIGS. 7 and 8, multiple paths may be present in a network. For example, referring to FIG. 7, a network 10 includes an RF power transmitter 12a connected in series with a first PTC 14a (implemented as a directional coupler) and a power splitter 54 (1 to 2). A first output of the power splitter 54 is connected to a second PTC 14b and terminates with a first terminating antenna (load) 16b. A second output of the power splitter 54 is connected to a third PTC 14c in series with a fourth PTC 14d and terminates with a second terminating antenna (load) 16d. The first, second, third, and fourth PTCs 14a-d are each connected to an antenna (a first antenna 20a, second antenna 20b, third antenna 20c, and fourth antenna 20d, respectively) and couple power to the respective antenna 20a-d in order to radiate power into various coverage areas. When in a coverage area, a device to be powered receives the radiated power. The received power is used to charge or re-charge the device or to directly power the device.

For another example, referring to FIG. 8, a network 10 includes an RF power transmitter 12a connected in series with a circulator 22 connected to a first PTC 14a (implemented as directional coupler). The first PTC 14a is connected in series to a second PTC 14b and a third PTC 14c and terminates with a first terminating antenna (load) 16c. The first PTC 14a is also connected in series to a fourth PTC 14d, and a fifth PTC 14e, and terminates with a second terminating antenna (load) 16e. The fourth PTC 14d is also connected to a sixth PTC 14f and terminates with a third terminating load 16f. The second, third, fifth, and sixth PTCs 14b, 14c, 14e, and 14f are each connected to an antenna (second antenna 20b, third antenna 20c, fifth antenna 20e, and sixth antenna 20f respectively) for radiating power into various coverage areas. It should be noted that a given PTC may not have an associated antenna for radiating power. When in a coverage area, a device to be powered receives the radiated power. The received power is used to charge or re-charge the device or to directly power the device.

Other Embodiments

Referring generally to FIG. 9, the invention, according to any embodiment, may be implemented as a switching network 10 (a network containing at least one switch 82). In the switching network 10, the PTC 14a, or at least one of the PTCs, is a switch 82a or contains a switch 82a. The components are connected in series.

The switch 82a may be, but is not limited to, electromechanical or solid state, such as a relay or PIN diode, respectively. The switch 82*a* may have any configuration suitable for the network 10, such as, but not limited to, SPST, DPDT, SP3T, etc.

Preferably, the switch 82*a* is also connected to an antenna 20*a*. The antenna 20*a* radiates power into a coverage area. The coverage area from a given antenna 20*a* may or may not overlap other coverage areas from other antennas 20*b*, 20*c*.

Preferably, the switch 82*a* either accepts or passes the power. When power is accepted, power is supplied to a particular component of the network 10, such as the antenna 20*a*. When power is passed, power is supplied to the next component in series. It should be noted that for PTCs 14 without a direct antenna connection, the switch 82*a* may pass power to one or more components sequentially or simultaneously.

Since each switch 82*a*, 82*b* either accepts or passes power, the network 10 may be designed to pulse power. In other words, any antenna 20*a*, 20*b* connected to a switch 82*a*, 82*b* may be turned on and off as desired. For example, one antenna 20*a* of the network may be turned on at a time. Pulsing networks were described in U.S. patent application Ser. No. 11/356,892 and U.S. Provisional Patent Application No. 60/758,018, both entitled Pulsing Transmission Network and incorporated herein by reference.

The switch 82*a* may be controlled by any suitable means. The switch 82*a* may be controlled by the RF power transmitter 12*a* using a control line 18. The control line may send communications and/or power to the switch 82*a*. The switch 82*a* may have a timer or a clock (e.g., a "smart switch"). A communication signal may be sent over a coaxial cable 18 at the same frequency or a separate frequency in order to tell the switch 82*a* when to switch. DC power may be sent over the transmission line to power the PTC 14*a*, in this case, the switch 82*a*, or any other component in the network. Additionally, any PTC or power distributing component may derive power from the transmission line by consuming some of the RF power, preferably, by rectifying the RF power to DC power.

The switch 82*a* may sense supplied pulses of power from an RF power transmitter 12*a* to determine when to switch. Pulses may be designed to create node identifications that signal the switch 82*a* to switch. The pulses may have differing frequencies (timings) or consist of varying durations (long and short pulses).

The switch 82*a* may sense for power. When power is detected at an input, the switch 82*a* may cause a pulse of power, and then pass power through for a period of time before pulsing again.

Preferably, the switch 82*a* may sense the supplied pulses, the pulses forming a node identification, or power by tapping a portion of the power from the transmission line 18 and rectifying the RF power to DC power in order supply switching information to the switch 82*a* or switch controller 74*a* (discussed below). The rectified DC power informs the switch 82*a* or switching controller 74*a* that the RF power transmitter 12*a* is supplying pulses, sending a node identification, or sending power.

Additionally, the switch 82*a* may sense if DC power is available on the transmission line 18 along with the RF power. The DC power may be used to directly power the switch 82*a* or switch controller 74 or may be used as in input to the switch controller 74. If the DC power is used to directly power the switch 82*a*, a controller in the RF power transmitter 12*a* may control the switch(s) 82*a*, 82*b* by placing and removing DC power from the transmission line 18 in a pulsing manner.

It should be noted that any outputs of the switch 82*a* which are not active (i.e., connected to an antenna or other component of the network) may be open circuited or may be connected to a load 16 to ensure that unactive antennas do not significantly influence the radiation from the active antenna.

As illustrated in FIG. 9, for example, a single input series switching network 10 includes an RF power transmitter 12*a*, a first switch 82*a*, a second switch 82*b*, and a terminating antenna 16. The first switch 82*a* is connected to a first antenna 20*a*. The second switch 82*b* is connected to a second antenna 20*b*.

The first switch 82*a* may accept the power from the RF power transmitter 12*a* and send the power to the first antenna 20*a*. Alternatively, the first switch 82*a* may pass the power to the second switch 82*b*. The second switch 82*b* may accept the power and send the power to the second antenna 20*b*. Alternatively, the second switch 82*b* may pass the power to the terminating antenna 16. In this configuration, at any given time, the first antenna 20*a*, the second antenna 20*b*, or the terminating antenna 16 is radiating RF energy. The network 10 may be designed to pulse power from each of the first antenna 20*a*, second antenna 20*a*, and terminating antennas 16. The network 10 may be designed in such a way that for a given period of time, no antenna is transmitting power. This may be accomplished by turning the RF power transmitter 12*a* power down or off or by terminating the power into a load.

Figure 10:
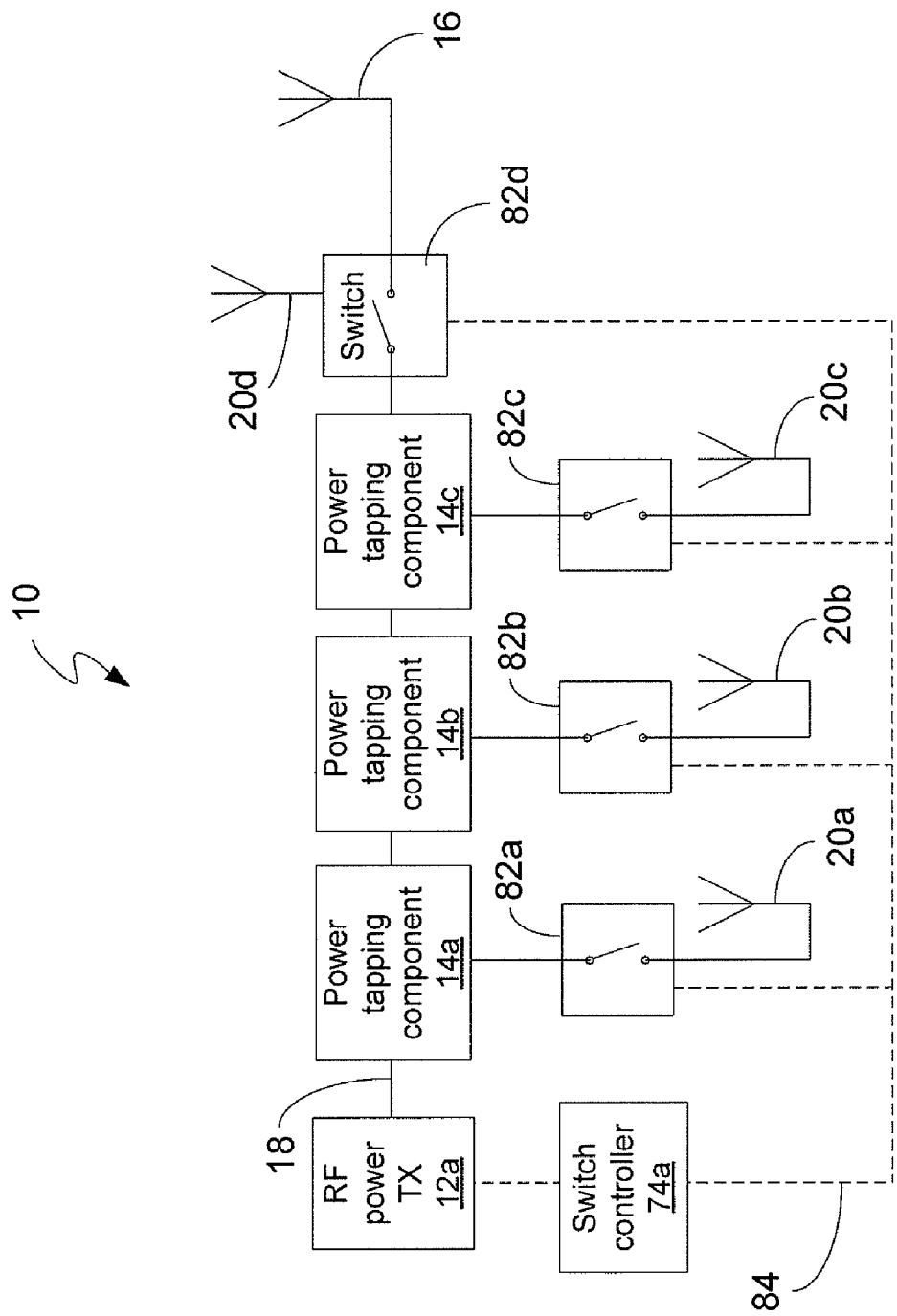
FIG. 10 is an illustration of a second switching network according to the present invention.

The network 10 may be configured to radiate RF energy from one or more antenna at any given time. As illustrated in FIG. 10, for example, a single input series switching network 10 includes an RF power transmitter 12*a*, a first PTC 14*a*, a second PTC 14*b*, a third PTC 14*c*. A first switch 82*a* is connected to the first PTC 14*a* and a first antenna 20*a*. A second switch 82*b* is connected to the second PTC 14*b* and a second antenna 20*b*. A third switch 82*c* is connected to the third PTC 14*c* and a third antenna 20*c*. A fourth switch 82*d* is also connected to the third PTC 14*c*. The fourth switch is connected to a fourth antenna 20*d* and a terminating antenna 16.

The first PTC 14*a* supplies power to the first switch 82*a* and the second PTC 14*b*. The first switch 82*a* may accept the power and supply the power to the first antenna 20*a*. Alternatively, the first switch 82*a* may pass the power to a terminating load (not shown) or open circuit.

The second PTC 14*b* supplies power to the second switch 82*b* and the third PTC 14*c*. The second switch 82*b* may accept the power and supply the power to the second antenna 20*b*. Alternatively, the second switch 82*b* may pass the power to a terminating load (not shown) or open circuit.

The third PTC 14*b* supplies power to the third switch 82*c* and the fourth switch 82*d*. The third switch 82*c* may accept the power and supply the power to the third antenna 20*c*. Alternatively, the third switch 82*c* may pass the power to a terminating load (not shown) or open circuit. The fourth switch 82*d* may accept the power and supply the power to the fourth antenna 20*d* or pass the power to the terminating antenna 16.

In this configuration, more than one antenna 20*a-d* may be active at any desired time. In a given installation of a network 10, the configuration of PTCs and switches should be determined by the desired coverage areas to be obtained from RF energy radiating from the antennas.

Referring generally to FIGS. 1, 2, 4, and 7-11 the invention, according to any of the embodiments, may include a controller 74*a* to control the operation of the network. Referring to FIG. 1, the controller 74*a* is connected to one or more of the components of the network 10. The controller 74*a* may be used to change the frequency, polarization, or radiation pattern of the antennas 20*ac*. The controller 74*a* may be used to create pulses of power from the network 10.

Referring to FIG. 2, more than one controller 74a is utilized to control the components of the network 10. A controller 74a may be in communication with one or more other controllers 74a of the network 10.

Referring to FIG. 10, a controller 74a is connected to a switching network 10. The controller 74a is utilized to control (or assist in controlling) the switching of the switches 82a-d.

Referring to FIG. 11, an implementation of a series power distribution/transmission network 10 is illustrated. The network includes an RF power transmitter 12a connected to a first PTC 14a, a second PTC 14b, a third PTC 14c, and a terminating antenna 16. The RF power transmitter 12a and the first, second, and third PTCs 14a-c are connected in series. Each of the first, second, and third PTCs 14a-c are connected to an antenna 20a-c, respectively (illustrated as dipoles although any antenna or radiating device may be used with this or any embodiment herein). The antennas 20a-c and 16 radiate power to a receiving antenna 92 (illustrated as a dipole) of a device 94 to be powered. The device 94 preferably includes a power harvester that converts the RF power into a form useable by the device 94.

A small scale version of the invention, for example, as shown in FIG. 11, helps to reduce the average power transmitted by a single antenna, thereby reducing safety concerns. This may be important in desktop applications. For example, the device 94 may receive power contribution from multiple antennas 20a-c, 16. The antennas 20a-c, 16 may be positioned in a U-shape or be mounted on a flexible unit so that the user may affix them to the desk area.

A tapping coupler may be used in the present invention to eliminate connector loss. This issue is discussed in detail in U.S. Pat. No. 6,771,143, which is incorporated herein by reference.

A network according to the present invention preferably uses a low loss coaxial cable, transmission line, or waveguide 18.

If a leaky coaxial cable 16 is used in the network, antennas may not be necessary. In this configuration, the coaxial cable 16 would radiate the power.

The various embodiments discussed above, and envisioned as encompassed by the present invention, may be implemented separately or in combinations with each other (in whole or in part).

The invention should not be confused with power transfer by inductive coupling, which requires the device to be relatively close to the power transmission source. The *RFID Handbook* by the author Klaus Finkenzeller defines the inductive coupling region as distance between the transmitter and receiver of less than 0.16 times lambda where lambda is the wavelength of the RF wave. The invention can be implemented in the near-field (sometimes referred to as inductive) region as well as the far-field region. The far-field region is distances greater than 0.16 times lambda.

In any embodiment of the present invention, the RF power transmitted may be limited to include power only, that is, data is not present in the signal. If data is required by the application, the data is, preferably, transmitted in a separate band and/or has a separate receiver.

It will be understood by those skilled in the art that while the foregoing description sets forth in detail preferred embodiments of the present invention, modifications, additions, and changes might be made thereto without departing from the spirit and scope of the invention.

The invention claimed is:

1. An apparatus, comprising:
 an RF power transmitter configured to generate power;
 a first power tapping component coupled to the RF power transmitter, the first power tapping component configured to separate the power received from the RF power transmitter to produce a first power portion and a second power portion;
 a second power tapping component coupled to the first power tapping component, the second power tapping component configured to separate the second power portion to produce a third power portion and a fourth power portion;
 a first antenna coupled to the first power tapping component, the first antenna configured to transmit the first power portion received from the first power tapping component;
 a second antenna coupled to the second power tapping component, the second antenna configured to transmit the third power portion received from the second power tapping component; and
 a controller in communication with at least one of the first power tapping component, the second power tapping component, the first antenna, or the second antenna.

2. The apparatus according to claim 1, wherein the first power tapping component includes a directional coupler.

3. The apparatus according to claim 2, wherein the directional coupler includes a field adjustable directional coupler.

4. An apparatus comprising:
 a first RF power transmitter configured to generate power;
 a first power tapping component coupled to the RF power transmitter, the first power tapping component configured to separate the power received from the RF power transmitter to produce a first power portion and a second power portion;
 a second power tapping component coupled to the first power tapping component, the second power tapping component configured to separate the second power portion to produce a third power portion and a fourth power portion;
 a first antenna coupled to the first power tapping component, the first antenna configured to transmit the first power portion received from the first power tapping component;
 a second antenna coupled to the second power tapping component, the second antenna configured to transmit the third power portion received from the second power tapping component; and
 a second RF power transmitter configured to generate power, the second RF power transmitter coupled to the second power tapping component.

5. The apparatus according to claim 4, further comprising:
 a controller in communication with at least one of the first power tapping component, the second power tapping component, the first antenna, the second antenna, or the second RF power transmitter.

6. The apparatus according to claim 4, wherein the first power tapping component includes a bi-directional coupler.

7. The apparatus according to claim 4, wherein the first power tapping component includes a power distributor.

8. The apparatus according to claim 4, further comprising:
 a third RF power transmitter configured to generate power;
 a third power tapping component coupled to the first power tapping component and to the second power tapping component, the third power tapping component configured to separate the power received from the third RF power transmitter to produce a fifth power portion and a sixth power portion; and a third antenna coupled to the third power tapping component, the third antenna configured to transmit the fifth power portion received from the third power tapping component.

9. The apparatus according to claim 8, further comprising:
a controller in communication with at least one of the first power tapping component, the second power tapping component, the third power tapping component, the first antenna, the second antenna, the third antenna, the second RF power transmitter, or the third RF power transmitter.

10. The apparatus according to claim 1, further comprising:
a terminating load coupled to the second power tapping component.

11. The apparatus according to claim 1, further comprising:
a transmission line configured to couple the RF power transmitter and the first power tapping component.

12. The apparatus according to claim 1, further comprising:
a transmission line configured to couple the first power tapping component and the second power tapping component.

13. The apparatus according to claim 1, wherein the controller is configured to alter a frequency of the first power portion transmitted at the first antenna.

14. The apparatus according to claim 1, wherein the controller is a first controller, the apparatus further comprising:
a second controller in communication with the first controller, the second controller in communication with at least one of the RF power transmitter, the first power tapping component, the second power tapping component, the first antenna, or the second antenna.

15. The apparatus according to claim 1, wherein the RF power transmitter, the first power tapping component, the second power tapping component, the first antenna, and the second antenna are collectively configured to wirelessly transmit the power generated by the RF power transmitter via at least one pulse of power.

16. The apparatus according to claim 1, wherein the first antenna includes a transmission line.

17. The apparatus according to claim 1 wherein:
the first power tapping component is configured to rectify a portion of the power generated by the RF power transmitter to produce a DC power; and
the first power tapping component is configured to operate based on a portion of the DC power.

18. The apparatus according to claim 1, wherein:
the RF transmitter includes a first connector configured to couple the RF power transmitter to the first power tapping component, and
the first power tapping component includes a second connector configured to couple the first power tapping component to the second power tapping component.

19. The apparatus of claim 1, wherein the controller is configured to alter at least one of a radiation pattern of the first power portion transmitted at the first antenna or a polarization of the first power portion transmitted at the first antenna.

20. The apparatus of claim 1, wherein:
the controller is configured to enable transmission of the first power portion at the first antenna during a first period; and
the controller is configured to disable transmission of the third power portion at the second antenna during a second period, a portion of the first period including at least a portion of the second period.

21. The apparatus according to claim 1, wherein:
the RF transmitter is configured to generate a DC power; and
the first power tapping component is configured to receive at least a portion of the DC power and operate based on the portion of the DC power.

22. An apparatus comprising:
an RF power transmitter configured to generate power;
a first power tapping component coupled to the RF power transmitter, the first power tapping component configured to separate the power received from the RF power transmitter to produce a first power portion and a second power portion, the first power tapping component including a switch;
a second power tapping component coupled to the first power tapping component, the second power tapping component configured to separate the second power portion to produce a third power portion and a fourth power portion;
a first antenna coupled to the first power tapping component, the first antenna configured to transmit the first power portion received from the first power tapping component; and
a second antenna coupled to the second power tapping component, the second antenna configured to transmit the third power portion received from the second power tapping component.

23. The apparatus according to claim 22, wherein the switch is configured to be controlled via a control line.

24. The apparatus according to claim 22, wherein the switch is configured to be controlled by sensing power.

25. The apparatus according to claim 24, wherein the sensed power includes a first pulse of power and a second pulse of power.

26. The apparatus according to claim 25, wherein the first pulse of power has a duration different from a duration of the second pulse of power.

27. The apparatus according to claim 25, wherein the first pulse of power occurs at a different time instance than the second pulse of power.

28. The apparatus according to claim 22, wherein the switch is configured to be controlled via a communications signal.

29. The apparatus according to claim 28, wherein the communications signal is received by the switch via a coaxial cable.

30. An apparatus comprising:
an RF power transmitter configured to generate power;
a first power tapping component coupled to the RF power transmitter, the first power tapping component configured to separate the power received from the RF power transmitter to produce a first power portion and a second power portion;
a second power tapping component coupled to the first power tapping component, the second power tapping component configured to separate the second power portion to produce a third power portion and a fourth power portion;
a first antenna coupled to the first power tapping component, the first antenna configured to wirelessly transmit the first power portion received from the first power tapping component, the first power tapping component and the first antenna collectively configured to wirelessly transmit a portion of the first power portion via at least a first pulse of power, the first pulse of power having a first duration; and a second antenna coupled to the second power tapping component, the second antenna configured to transmit the third power portion received from the second power tapping component, the second power tapping component and the second antenna collectively configured to wirelessly transmit a portion of the second power portion via at least a second pulse of power, the second pulse of power having a second duration different from the first duration.

31. The apparatus according to claim 30, further comprising:
a controller in communication with at least one of the first power tapping component, the second power tapping component, the first antenna, or the second antenna.

32. The apparatus according to claim 30, wherein the first power tapping components includes a switch.

33. The apparatus according to claim 30, wherein:
the first power tapping component is configured to rectify a portion of the power generated by the RF power transmitter to produce a DC power; and
the first power tapping component is configured to operate based on a portion of the DC power.

34. The apparatus of claim 30, wherein:
the first power tapping component and the first antenna are collectively configured to wirelessly transmit the portion of the first power portion via at least the first pulse of power and a third pulse of power, the first pulse of power and the third pulse of power separated by a first period; and
the second power tapping component and the second antenna are collectively configured to wirelessly transmit the portion of the second power portion via at least the second pulse of power and a fourth pulse of power, the second pulse of power and the fourth pulse of power separated by a second period different from the first period.

35. A method, comprising:
generating a first RF power signal during a first period;
generating a second RF power signal during a second period, at least a portion of the second period concurrent with a portion of the first period, and at least a portion of the second portion being mutually exclusive from a portion of the period;
separating the first RF power signal into a first portion of the first RF power signal and a second portion of the first RF power signal at a first power tapping component;
transmitting the first portion of the first RF power signal at an antenna;
providing at least a portion of the second portion of the first RF power signal to a second power tapping component coupled to the first power tapping component; and
providing the second RF power signal to the second power tapping component.

36. The method according to claim 35, further comprising:
receiving at least a portion of the transmitted first portion of the first RF power signal at a remote device; and
converting the at least a portion of the first portion of the first RF power signal received at the remote device to DC power.

37. The method of claim 36, further comprising:
activating a first switch coupled to the first power tapping component and the first antenna such that the first portion of the generated RF power signal is transmitted as at least one on-off modulated pulse of power; and
activating a second switch coupled to the second power tapping component and the second antenna such that the third portion of the generated RF power signal is transmitted as at least one on-off modulated pulse of power.

38. The method according to claim 35 wherein the antenna is a first antenna, the method further comprising:
separating the second portion of the first RF power signal into a third portion of the first RF power signal and a fourth portion of the first RF power signal at the second power tapping component; and
transmitting the third portion of the generated first RF power signal at a second antenna coupled to the second power tapping component.

39. The method of claim 35, further comprising activating a switch coupled to the first power tapping component and the first antenna such that the first portion of the generated RF power signal is an on-off modulated pulse of power.

* * * * *